United States Patent [19]

Ćuk

[11] 4,257,087
[45] Mar. 17, 1981

[54] dc-TO-dc SWITCHING CONVERTER WITH ZERO INPUT AND OUTPUT CURRENT RIPPLE AND INTEGRATED MAGNETICS CIRCUITS

[75] Inventor: Slobodan M. Ćuk, Huntington Beach, Calif.

[73] Assignee: California Institute of Technology, Pasadena, Calif.

[21] Appl. No.: 26,541

[22] Filed: Apr. 2, 1979

[51] Int. Cl.³ .......................................... H02M 3/335
[52] U.S. Cl. ........................................ 363/16; 363/40
[58] Field of Search ...................... 363/16, 20, 39, 40, 363/45, 124, 131

[56] References Cited

U.S. PATENT DOCUMENTS 4,184,197  1/1980  Cuk et al. ................................. 363/16

Primary Examiner—William M. Shoop
Attorney, Agent, or Firm—Freilich, Hornbaker, Wasserman, Rosen & Fernandez

[57] ABSTRACT

An improved dc-to-dc converter is provided comprised of two inductances, an input inductance in series with the input source and an output inductance in series with the load, and between the two inductances, two storage capacitances in series with the two inductances. Switching means alternately connect the junction between the input inductance and the first series capacitance, and the junction between the second capacitance and output inductance, to a junction common to the source and load. A third inductance is connected between the junction of the two capacitances and the return current paths for the source and load.

In one of the embodiments of the invention, all three inductances are combined on the same core thus comprising a single magnetic circuit with three windings. In another embodiment of the invention an isolation transformer is first used to replace the third inductance. Again, both input and output inductor and isolation transformer are merged into a single magnetic circuit with four windings. In any of the embodiments of the invention, a zero current ripple can be obtained at both the input and the output simultaneously by a proper design of the magnetic circuit. A new method of integrated magnetics design is then disclosed to improve performance of other converter structures by properly merging their magnetics components.

20 Claims, 23 Drawing Figures

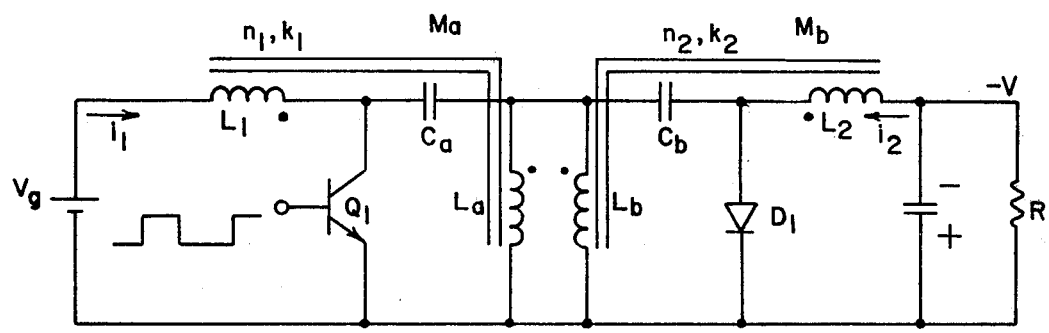
F I G. 5
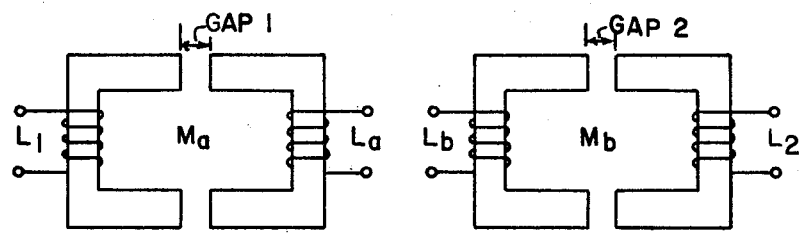
F I G. 5a
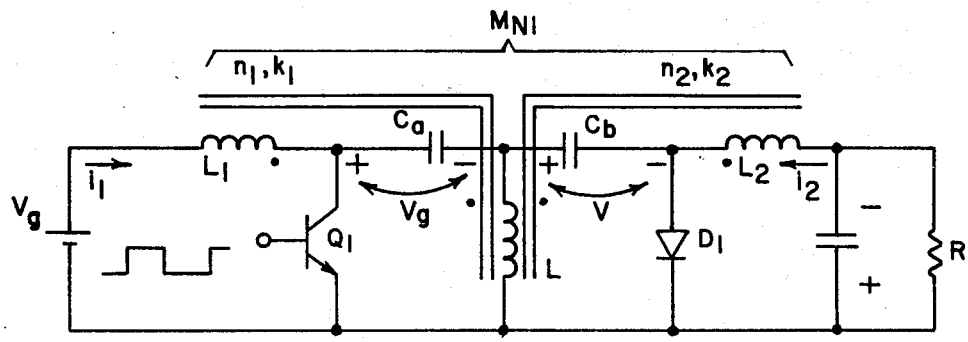
F I G. 6
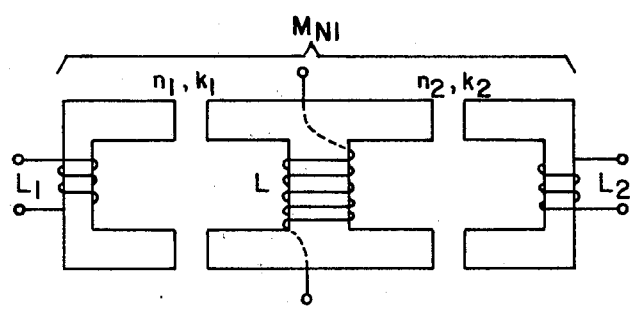
F I G. 6a

DC-TO-DC SWITCHING CONVERTER WITH ZERO INPUT AND OUTPUT CURRENT RIPPLE AND INTEGRATED MAGNETICS CIRCUITS

BACKGROUND OF THE INVENTION

This invention relates to dc-to-dc converters, and more particularly to improvements over the new optimum topology switching converters disclosed in an application Ser. No. 837,532 by Slobodan M. Cuk and Robert D. Middlebrook filed on Sept. 28, 1977.

In the new switching converters disclosed in the aforesaid application, two inductances are employed, one in series with the input source and the other in series with the output load, together with a storage capacitance between the inductors. Suitable switching means are provided for alternately connecting the junction between the input inductance and the storage capacitance, and the junction between the output inductance and storage capacitance, to return current paths for the source and load. The result is that dc-to-dc conversion is achieved with both input and output (inductor) currents non-pulsating, i.e., with only a small switching ripple inversely proportional to the inductance values superimposed on their dc (average) values.

Simplification of this new switching converter topology and further improvement of its performance is obtained by the technique of coupling the inductors of this converter into a single magnetic circuit with two windings as described in detail in the aforesaid patent application. The coupling of inductances leads to at least a reduction to half of both current ripples. However, by proper design it is possible to obtain zero-current ripple on the output (or the input), while the current ripple at the input (or the output) remains at its unreduced level, i.e. its level before the coupling. The coupled inductances thus provide nonpulsating currents with ripple reduced to zero at either the input or the output, or reduced by one half at the input and the output.

In applications where the source and the load may not be referenced to a common ground, an isolating transformer may be inserted by dividing the energy transferring storage capacitor into two series capacitances, and then connecting one of these capacitances in series with the primary winding of the isolation transformer, and the other capacitance in series with the secondary winding of the isolation transformer. The input and output inductances may still be coupled to reduce the input or output current ripple to zero, but not both. As in the case of the nonisolated converter with coupled inductances, either a balanced reduction of ripple on both sides, or an imbalanced reduction of ripple on either side can be achieved by a proper design (or adjustment) of the coupling.

However, the coupled-inductor version of either the isolated or nonisolated extension of the optimum topology converter provided, by a proper design, zero current ripple at only one side, either the converter input or output side, but not at both simultaneously. This then naturally led to a search for such a switching converter configuration which will achieve these ideally desired characteristics of zero current ripple at both input and output simultaneously. With a high efficiency constraint in mind, the further objective was to achieve these goals with the least number of storage elements and switches put together in the most favorable topology, hence the optimum topology converter described in the copending application was used as a basis.

From another viewpoint, the coupled-inductor extension of the optimum topology converter (both isolated and nonisolated versions) was the first time that two magnetic components (inductors), which are normally and exclusively used separately to perform their function, have been integrated into a single magnetic circuit (single core) with two windings, resulting in size and weight reduction, component count reduction and performance improvement. This then motivated the search for such switching configurations in which the integration of otherwise independent and separate magnetic components can be achieved at an even higher level, by incorporating both separate inductors and AC transformers into a single magnetic circuit with additional size and weight reduction as well as performance improvement.

Both of these objectives, that is zero ripple at both input and output as well as magnetic circuit simplification and reduction of its size and weight, have been achieved in the switching converter configuration as disclosed by this invention. A number of improvements over the previously disclosed optimum topology converter (Application Ser. No. 837,532) are demonstrated. In addition, it is shown how some other known as well as new switching converter configurations may be improved by the integrated magnetic circuit technique disclosed in this application.

SUMMARY OF THE INVENTION

An improved dc-to-dc switching converter is provided comprised of two inductances, an input inductance in series with the input source and an output inductance in series with the output load and two storage capacitors connected in series between the two inductances. Switching means alternately connect the junction between the input inductance and the first series capacitor to the return current path for the source, and the junction between the output inductance and the second series capacitor to the return current path for the load. Electromagnetic induction means, such as a third inductance, for connecting the storage capacitor connected to the input inductance to the return current path for the source, and for connecting the other storage capacitor to the return current path for the load.

In one embodiment of the invention, all three inductances are combined on the same core thus comprising a single magnetic circuit with three windings whose coupling coefficients and turns ratios between the third inductance and input inductance and between third inductance and output inductance are adjusted such that reduced current ripple is achieved simultaneously at both the input and the output of the converter. For the matching condition $n_i = k_i$, zero ripple is achieved, where in each side $n_i$ is equal to the square root of the ratio of self inductances of the third winding L to the inductance $L_i$, where i is 1 to indicate the input inductor, and i is 2 to indicate the output inductor.

In another embodiment of the invention, an isolation transformer replaces the third inductance, and a single magnetic circuit with four windings is obtained whose two isolation transformer windings are coupled with the other two windings in such a way as to achieve simultaneously zero current ripple at both the input and the output of the converter.

These embodiments and a number of related extensions are all examples of a new integrated magnetic circuit concept. For the first time, a number of magnetic components normally and exclusively used separately to perform functions of inductors and/or AC transformers are now integrated into a single magnetic circuit. This not only results in the significant reduction of magnetics size and weight, but also in a substantial improvement of the overall converter circuit performance. For example, by a proper design of the magnetic circuit, even zero current ripple may be achieved simultaneously at both input and output with or without DC isolation capability.

Moreover, the principles and technique of this integrated magnetic circuit design are not limited to the particular optimum topology switching converter as described more fully hereinafter, but have a broad range of applications. For example, it is demonstrated that is can be implemented in other converters as well as dc-to-ac inverters or power amplifiers which satisfy certain prerequisites, and still result in both size and weight reduction and performance improvement.

The novel features of the invention are set forth with particularity in the appended claims. The invention will best be understood from the following description when read in conjunction with the accompanying drawings.

BRIEF DESCRIPTION OF THE DRAWINGS

FIG. 5 is a circuit diagram of one embodiment of this invention, in which inductance L of the converter in FIG. 3 is divided into two parallel inductances $L_a$ and $L_b$ separately coupled to the input and output inductances $L_1$ and $L_2$.

FIG. 5a illustrates an exemplary realization of coupled inductances $M_a$ and $M_b$ in the converter of FIG. 5.

FIG. 6 is a circuit diagram of a nonisolated version of another embodiment of this invention in which inductance L in the converter of FIG. 3 is directly coupled to both input and output inductances $L_1$ and $L_2$.

FIG. 6a illustrates an exemplary realization of the magnetic circuit $M_{NI}$ in the converter of FIG. 6.

DESCRIPTION OF PREFERRED EMBODIMENTS

Figure 1A:
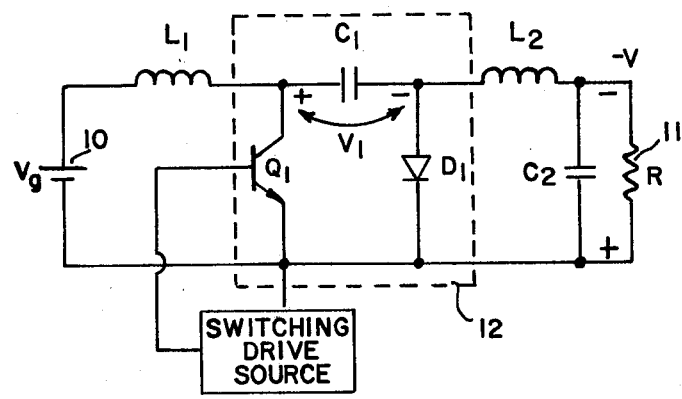
FIG. 1a is a circuit diagram of a new switching converter as disclosed in the aforesaid application, and therefore labeled prior art.

Referring to FIG. 1a, a new optimum topology switching dc-to-dc converter between a source 10 and a load 11 is shown as disclosed in the aforesaid application. The dc-to-dc converter is comprised of two inductances, an input inductance $L_1$ in series with the source, and an output inductance $L_2$ in series with the load, and energy transferring means 12 having storage capabilities connected between the two inductances. The energy transferring means is comprised of storage capacitance $C_1$ in series with the two inductances and switching means (transistor $Q_1$ and diode $D_1$) for alternately connecting the junction between the input inductance and the storage capacitance and the junction between the storage capacitance and the output inductance to a common point between the souce and load for return currents to the source and load.

Figure 1B:
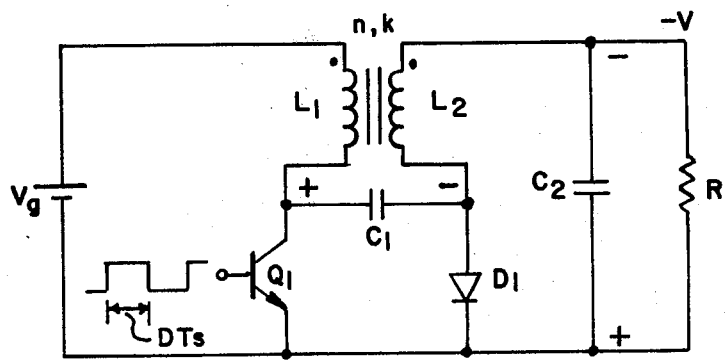
FIG. 1b is a coupled-inductor version of the new converter also disclosed in the aforesaid application, and hence labeled prior art.

In the coupled-inductor version of the prior art (also disclosed in the aforesaid application) shown in FIG. 1b, the two inductors are coupled on a single core, resulting in the inductor current ripple reduction at both input and output. In fact, when this coupled inductor transformer is designed to satisfy the matching condition n=k, where $n=\sqrt{L_1/L_2}$ is the effective turns ratio and $L_1$ and $L_2$ are self inductances of the primary and secondary windings respectively, and k is the coupling coefficient between the two windings, even zero output current ripple can be obtained, with input current ripple simultaneously staying at its level before the coupling. Interchange of the primary and secondary of so designed coupled-inductors will result in zero ripple at the input. This coupled inductor converter has for the first time integrated the two inductors, which are usually considered as separate components, into a single magnetic circuit with two windings. This resulted not only in reduced component count, smaller size and weight, but also in performance improvement and even zero current ripple at either the input or the output. However, in this configuration, zero ripple can not be achieved simultaneously at both ends.

Figure 1C:
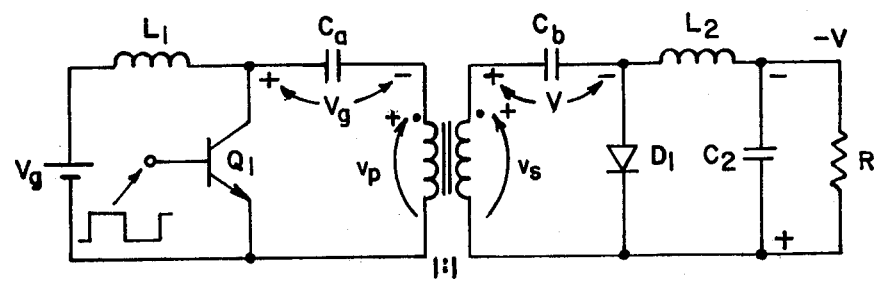
FIG. 1c is a new switching converter with isolation between the input and output as disclosed in aforesaid application, and hence labeled prior art.
Figure 4:
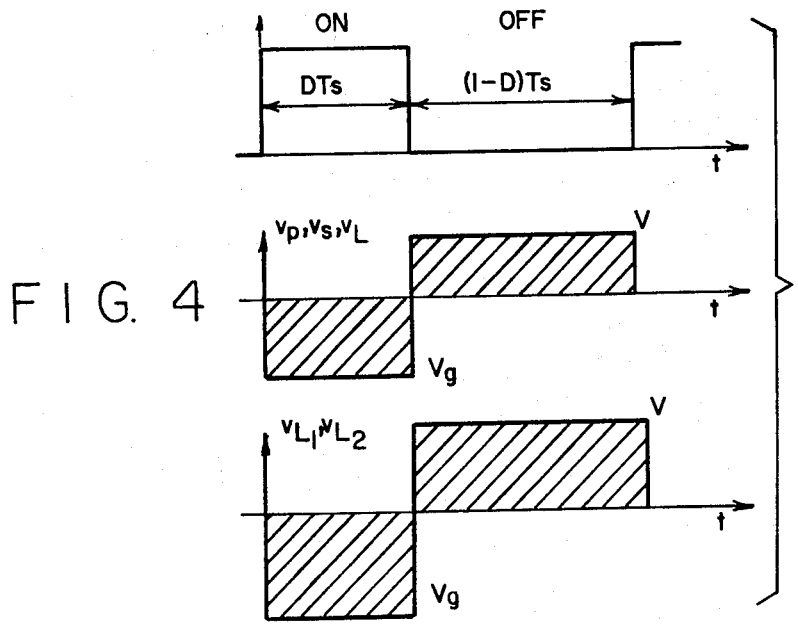
FIG. 4 illustrates ideal switching voltage waveforms on the inductances in the converter of FIG. 3.

In the isolated version of the prior art (also disclosed in the aforesaid application) shown in FIG. 1c, an isolation transformer is included by dividing the energy storage capacitor $C_1$ of FIG. 1a into two series capacitors $C_a$ and $C_b$, and then connecting one of these capacitors ($C_a$) in series with the primary winding of the isolation transformer, and the other capacitor ($C_b$) in series with the secondary winding of the isolation transformer. An analysis of this switching converter shows that the voltages on the capacitors $C_a$ and $C_b$ are ideally DC and equal to $V_g$ and V, respectively. Thus, due to the switching action of the transistor $Q_1$ and diode $D_1$, primary and secondary instantenous voltages $v_p$ and $v_s$ of the isolation transformer are ideally rectangular waveforms switching between the input DC voltage $V_g$ (transistor on) and output DC voltage V (transistor off) as shown in FIG. 4. These additional switching voltage waveforms discovered in the converter of FIG. 1c can be used to advantage as will now be described.

Figure 2:
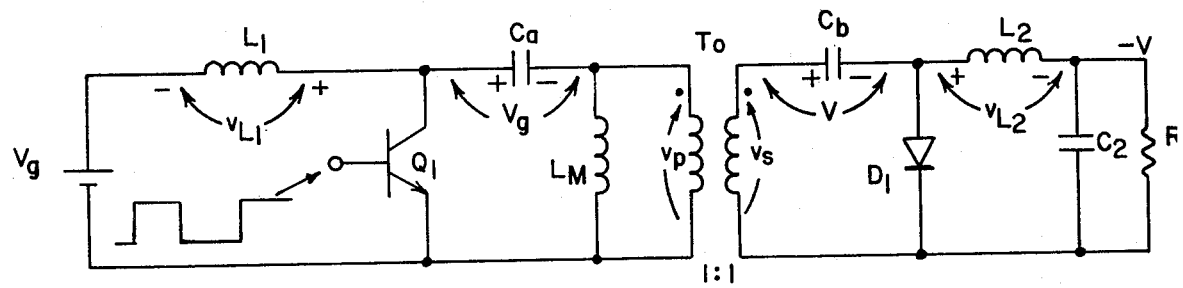
FIG. 2 includes a near ideal transformer model for the isolation transformer of the converter in FIG. 1c.
Figure 3:
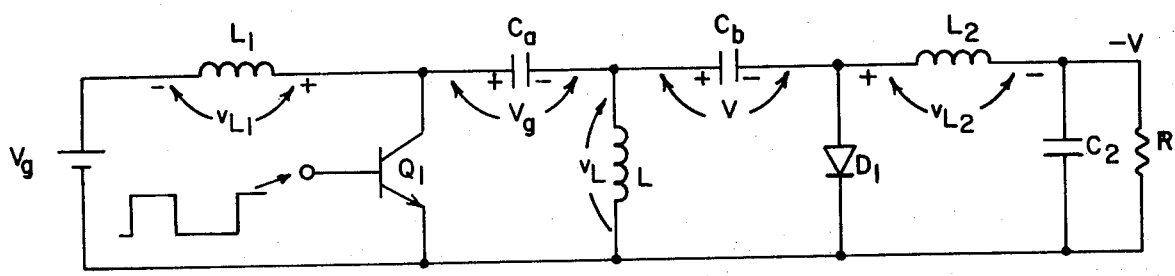
FIG. 3 is a circuit diagram of a nonisolated new switching converter with additional inductance L.

Consider first a simplified version of the converter in FIG. 1c, which is obtained by a replacement of the isolation transformer with its near ideal model (zero leakage inductance and finite mutual inductance $L_M$), as shown in FIG. 2. If isolation is of no particular concern for some applications, a nonisolated version of FIG. 2 may then be considered wherein $L_M$ does not have to be a mutual inductance of an isolation transformer, but may be any separate inductance L as shown in FIG. 3. It is important to note that the instantaneous voltage waveform $v_L$ on this inductance is the same as the voltage waveforms $v_p$ and $v_s$ in the arrangement of FIG. 2, namely the switching waveforms shown in FIG. 4 (this is also apparent from the volt-sec balance on the inductor L in the steady state). In addition, the volt-sec balance on the input and output inductors $L_1$ and $L_2$, leads to the same rectangular switching voltage waveforms $v_{L1}$ and $v_{L2}$ on these inductors, as illustrated in FIG. 4 also.

From the foregoing it becomes apparent that the inductance L may be coupled with either the input inductor $L_1$ to substantially reduce the input current ripple, or it may be coupled with the output inductor $L_2$ to substantially reduce the output current ripple. In fact, both input or output current ripple may be reduced to zero if the appropriate matching conditions are satisfied. The matching condition, as described in the aforesaid application, is defined as $n = k$, where n is equal to the square root of the ratio of self inductances of the primary and secondary windings coupled, and k is their coupling coefficient. For this purpose, inductance L is considered the primary winding and inductances $L_1$ and $L_2$ are considered the secondary windings. In terms of performance, this leads to the same result as the previously described coupled-inductor (FIG. 1b) of the prior art, namely zero current ripple at either the input or output. However, with a little modification of the converter in FIG. 3 both current ripples may be reduced to zero simultaneously. By providing two inductances $L_a$ and $L_b$ in parallel in place of one inductance as shown in FIG. 5, and coupling inductance $L_a$ to input inductance $L_1$, while coupling the inductance $L_b$ to output inductance $L_2$, both matching conditions can be obtained at the same time, thus realizing a dc-to-dc converter with ripple in both the input and the output current reduced to zero. This is obtained when the matching conditions $n_1 = k_1$ and $n_2 = k_2$ are satisfied, where $n_i = \sqrt{L/L_i}$ and i is either 1 or 2 for the input or output inductance. The two inductances $L_a$ and $L_b$ are not coupled magnetically, but are only connected electrically in parallel. As a consequence, the two coupled inductances $M_a$ and $M_b$ are connected in cascade with the switching voltage $v_L$ imposed on the primaries ($L_a$ or $L_b$) of the two transformers. As before in the coupled-inductor version of the aforesaid application, the matching condition $n = k$ is only a property of the transformer design. Hence to the first order, zero ripple at both input and output is maintained despite the possible changes in the operating conditions (duty ratio D, switching frequency fs), parameter changes (change of load resistance R) or conduction mode changes.

Figure 7:
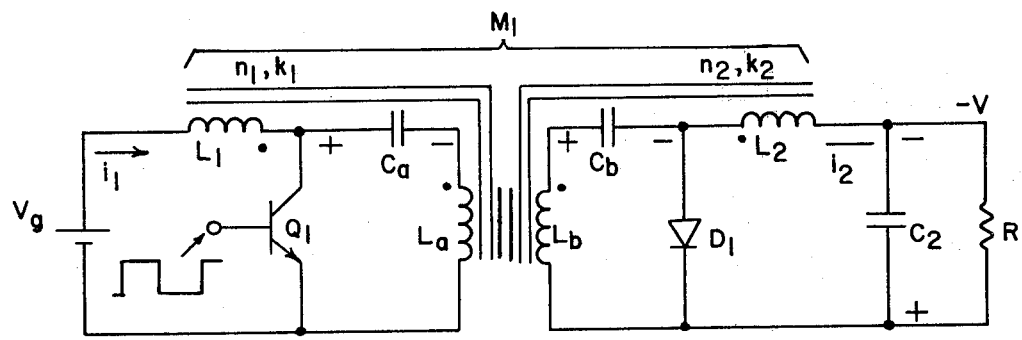
FIG. 7 illustrates another embodiment of this invention which provides for isolation between the input and output.
Figure 7A:
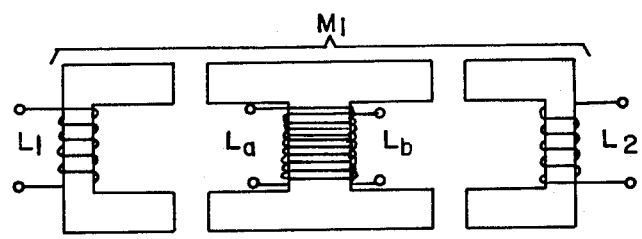
FIG. 7a illustrates one exemplary realization of the magnetic circuit $M_I$ with isolation in the converter of FIG. 7, which consists of a single magnetic circuit and four windings.
Figure 7B:
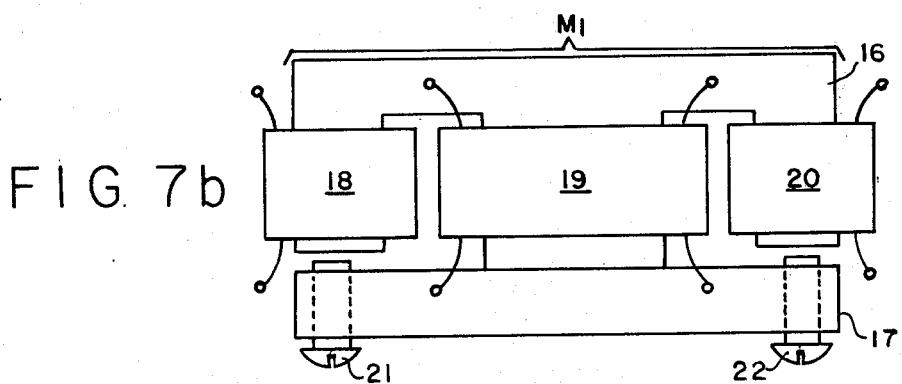
FIG. 7b illustrates yet another exemplary realization of the magnetic circuit $M_I$ in the converter of FIG. 7.
Figure 7C:
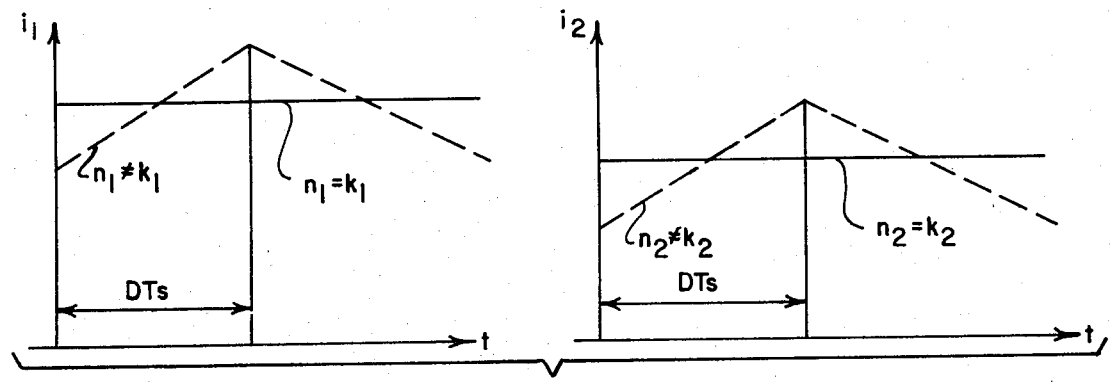
FIG. 7c illustrates input and output inductor currents for matching conditions (zero ripple-heavy line) or otherwise (dotted line).

In practicing the invention as described with reference to FIG. 5, the windings of the coupled inductances $M_a$ and $M_b$ are wound on U-cores to permit the matching conditions to be readily achieved by adjusting the air gap between opposing ones of the U-cores in each coupled inductor as shown schematically in FIG. 5a. Then the current ripples shown by dotted lines in FIG. 7c are vanishing at both input and output as seen by a heavy line in FIG. 7c.

However, it is not necessary to have separate inductances $L_a$ and $L_b$ in the converter. A single winding L of FIG. 3 may be coupled to both input and output inductances, resulting in the embodiment shown in FIG. 6 in which previously separate magnetic components, coupled inductors $M_a$ and $M_b$ of FIG. 5, are now merged into a single magnetic circuit. In addition a number of windings is reduced from four to three. However, the outstanding feature of zero current ripple at both ends is still preserved. Hence, in summary, the addition of a single winding to the coupled-inductor version (FIG. 1b) of the aforesaid prior art, and its appropriate connection in the converter configuration leads to the switching converter with zero current ripple at both ends. In practicing this invention, one possible approach may be a nonisolated (NI) magnetic circuit $M_{NI}$ constructed as shown in FIG. 6a, in which both matching conditions $n_i = k_i$ (where i is 1 or 2 as defined previously) may be satisfied at the same time by adjusting the separate air gaps. Again the input and output current waveforms will be as shown by heavy lines in FIG. 7c for no ripple.

It may be noted that the magnetic circuit $M_{NI}$ is such that the input inductor $L_1$ and output inductor $L_2$ are not directly coupled to each other as they were in the coupled inductor converter of FIG. 1b. This is illustrated in FIG. 6 by the parallel bars indicating appropriate coupling. Thus, FIG. 6 schematically shows that the input inductor $L_1$ is coupled to the third inductor L, and that the output inductor $L_2$ is coupled to the third inductor L, but that the input and output inductors $L_1$ and $L_2$ are virtually not coupled. This convention for schematically illustrating separate inductance couplings for the input and output inductances is used in the remaining figures.

The embodiments of FIG. 5 and FIG. 6 provide for zero current ripple in both the input and the output at the same time. They do not, however, provide for isolation between the input source and the output load. To achieve that advantage in the converter with the isolation of FIG. 1c, the input inductance $L_1$ may be coupled to the primary winding $L_a$ of the isolation transformer $T_i$, and the output inductance $L_2$ to the secondary $L_b$ of the isolation transformer, while still preserving the isolation transformer, as shown in FIG. 7. It is now apparent that all the magnetic components of the original isolated converter of FIG. 1c (two inductors and isolation transformer) have been merged into an isolated (I) magnetic circuit $M_I$ with four windings. Again, by appropriate design of this magnetic circuit in respect to the matching conditions $n_1=k_1$ and $n_2=k_2$ between isolation windings and input and output inductor windings, zero current ripple is achieved at both ends (see FIG. 7c). One possible physical realization of such a complex magnetic structure with four windings is illustrated in FIG. 7a. The structure is the same as that in FIG. 6a, but with two windings $L_a$ and $L_b$ in place of one winding L. Thus, by the addition of a single winding to the magnetic circuit $M_{NI}$ of FIG. 6, as shown in FIG. 7a, a dc-to-dc converter is provided with the added advantage of current ripple reduced to zero in both the input and the output at the same time. The isolation windings of the magnetic circuit in FIG. 7a now serve two purposes in the switching dc-to-dc converter of FIG. 7. They not only provide the isolation, but when coupled to input and output inductor windings they provide a means for obtaining DC currents with no ripple at both ends, leading to the most effective use of both magnetic core and the windings.

In addition, the magnetic circuit $M_I$ is such that its isolation windings can be very tightly coupled($k=1$ in the configuration of FIG. 7a for example), thus resulting in a low leakage inductances. This is, of course, necessary for practical applications if the large transistor voltage spikes at the switching instants are to be avoided in the converter configuration of FIG. 7. As in FIG. 6, the magnetic circuit $M_I$ is such that the input inductor $L_1$ and the output inductor $L_2$ are not directly coupled.

The implementation of the magnetic circuit $M_I$ in the switching converter of FIG. 7, is not limited to that of FIG. 7a, since there is a large number of possible shapes and configurations of a single magnetic circuit with four windings which could accomplish the same goal. A variant of the double-air-gap structure of FIG. 7a, using standard EI cores nominally used for a single-phase transformer is illustrated in FIG. 7b. An E-core 16 of the transformer is closed by an I-core 17, except at the outer legs of the E-core where the necessary air gap is provided to achieve the required matching conditions for zero ripple. All the cores may be wound on bobbins 18, 19 and 20 slipped over the legs of the E-core. The air gaps could be adjusted by screws 21 and 22 for fine tuning of the matching condition.

Figure 8:
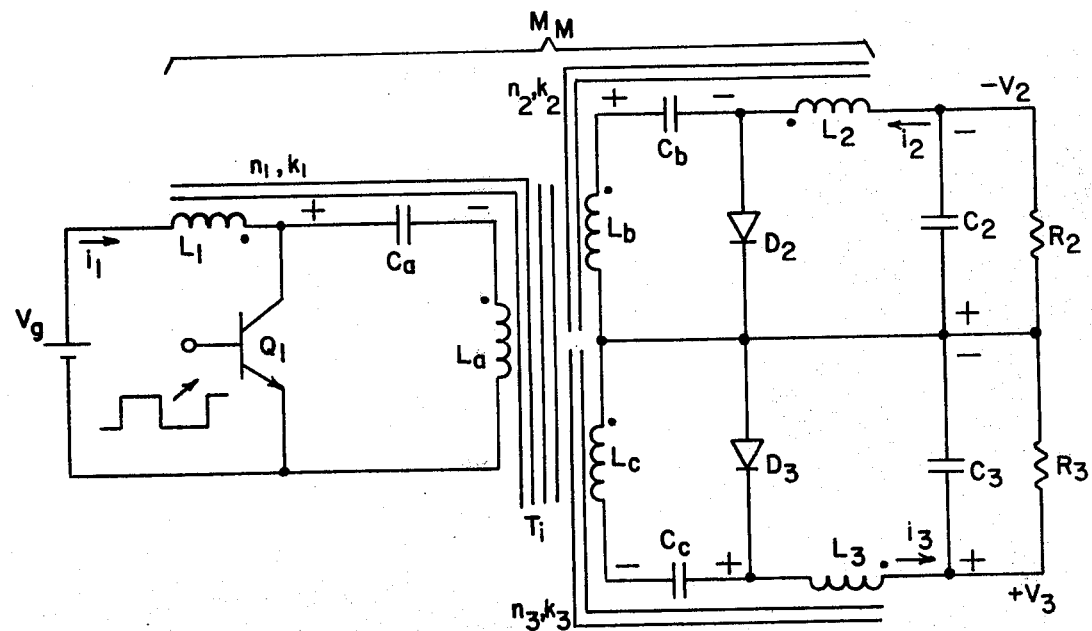
FIG. 8 illustrates a multiple (two) output version of the converter in FIG. 7 in which all six windings (one input inductor, two output inductors, and three windings of the isolation transformer) constitute a single magnetic circuit, $M_M$.

A natural extension of the converter configuration of FIG. 7 to multiple outputs is shown in FIG. 8. There, a single magnetic circuit $M_M$ with six windings is capable of providing zero current ripple not only at the input but simultaneously at both outputs as well. The actual physical implementation of the magnetic circuit $M_M$ may be a straightforward two dimensional extension of the magnetic structure in FIG. 7b (for example two peripendicular E cores with a common central leg). This could be extended for switching converters with three outputs.

Figure 9:
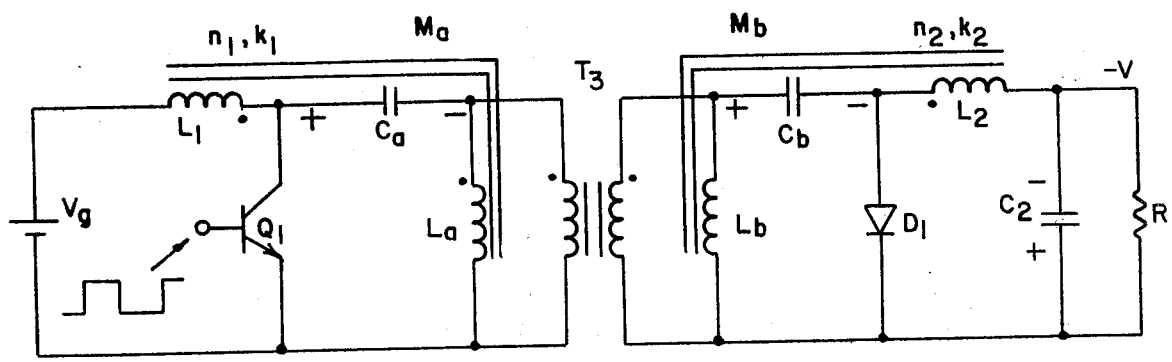
FIG. 9 is an isolated version of the converter in FIG. 5, in which a separate additional isolation transformer $T_3$ is inserted.

The embodiments presented clearly illustrate a new integrated magnetic circuit concept in which such diversified magnetic components, such as inductors and transformers exclusively used until now as separate components, are merged into an integral magnetic circuit with multiple windings. When put into the proper circuit configurations (such as those of FIGS. 6 and 7), they not only perform the original functions, but even tremendously improve original converter performance by reducing both input and output current ripples to zero. The savings in the component count, size and weight, as well as in efficiency become apparent when the converter of FIG. 7 is compared with another arangement of FIG. 7 shown in FIG. 9 as a variant of the present invention. The converter in FIG. 9 also has both current ripples reduced to zero by the proper design of magnetic circuits $M_a$ and $M_b$. However, with its isolation transformer $T_3$, it takes three magnetic cores with six windings as compared with the single magnetic core and four windings of the converter configuration in FIG. 7.

Figure 10A:
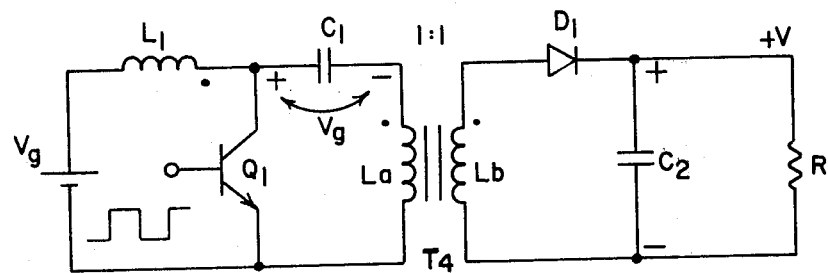
FIG. 10a is an example of a prior art converter to which the method and the technique described in this invention can be implemented.
Figure 10B:
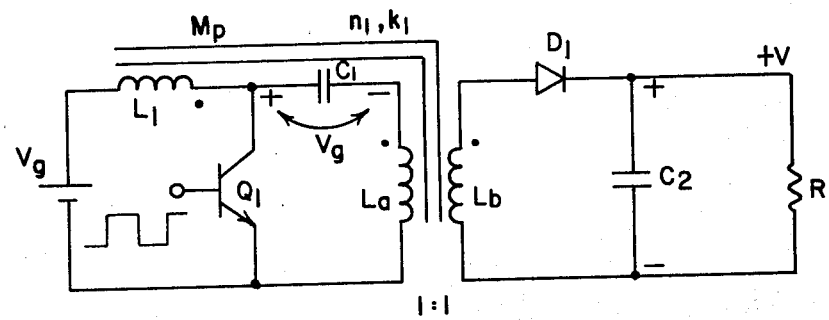
FIG. 10b illustrates the implementation.
Figure 11A:
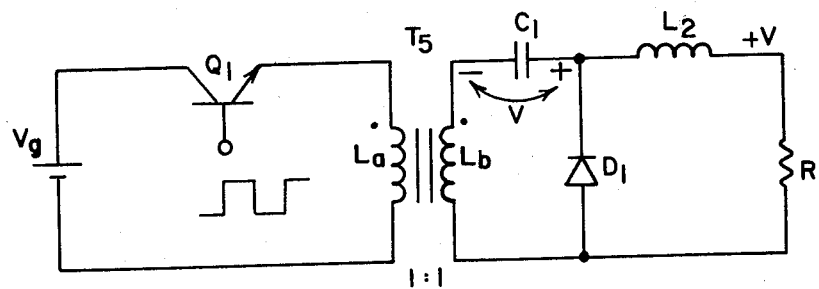
FIG. 11a is an example of another new converter to which the method and the technique described in this invention can be implemented.
Figure 11B:
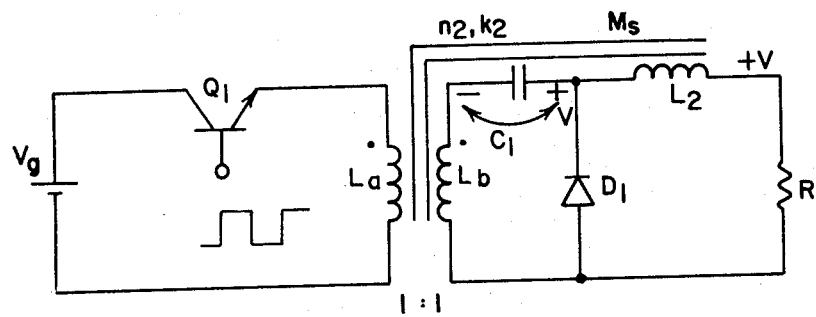
FIG. 11b illustrates the implementation.
Figure 12:
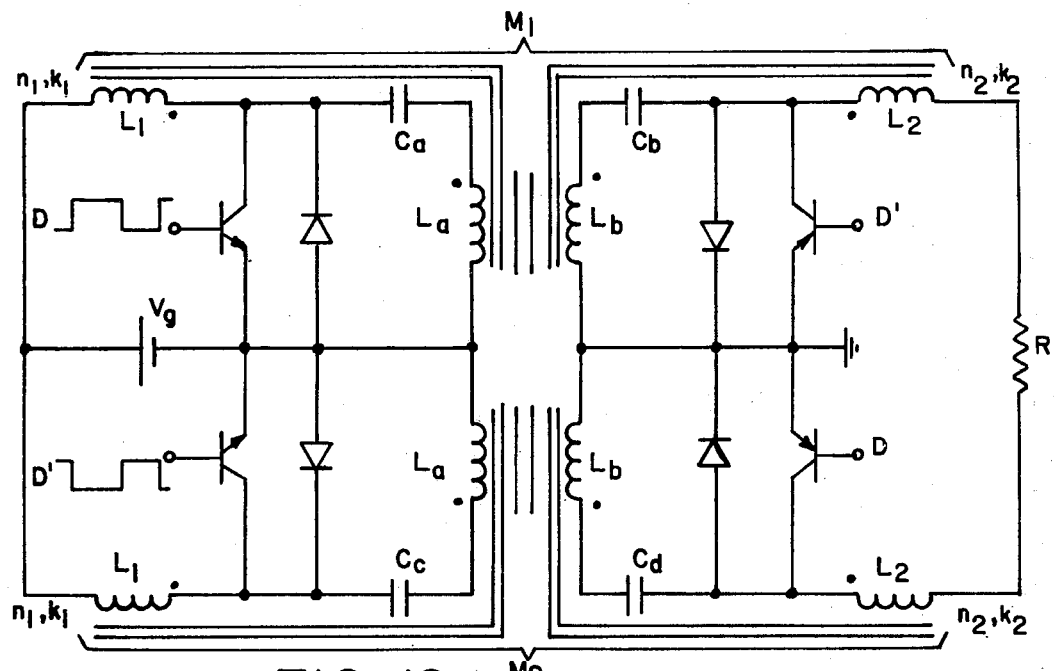
FIG. 12 is an example of a switching power amplifier stage to which the method and the technique described in this invention can be implemented.

This new concept of integrated magnetic circuit is applicable to a broad spectrum of electrical circuits involving magnetic components, and it leads to the similar overall performance improvement in other converters, coupled with the simplified configuration, and reduced component count, size and weight. To substantiate this general claim, this concept is now illustrated on several other converter configurations. For example, when applied to the prior art switching dc-to-dc converter of FIG. 10a, it results in another embodiment of this invention shown in FIG. 10b. The input inductor $L_1$ and the isolation transformer $T_4$ of the converter in FIG. 10a, are merged (or integrated) into a single magnetic circuit $M_p$ as shown in FIG. 10b, with the additional benefit of reducing the input current ripple to zero with the matching condition $n_1=k_1$. Still another example is a converter shown in FIG. 11a which also illustrates a new switching converter which has only output current nonpulsating. Again by merging the output inductor $L_1$ and isolation transformer $T_5$ into a single magnetic circuit $M_s$, another example of this integrated magnetics design is obtained, as illustrated in FIG. 11b. In this converter, the output current ripple may be reduced to zero by the matching condition $n_2=k_2$. The multiple output extension of the converters in FIGS. 10b and 11b may be obtained easily in a manner analogous to that of converter in FIG. 8. These two converter examples thus illustrate the wide range of switching converter configurations whose performance can be tremendously improved by use of this new integrated magnetic circuit concept. However, its application is not limited to switching dc-to-dc converters. Other switching configurations performing qualitatively different functions, such as dc-to-ac inversion, or power amplification, may also utilize the concept to advantage. For example, the concept may be directly applied to a new push-pull switching power amplifier disclosed in a patent application Ser. No. 902,725 filed May 2, 1978. For example, if isolation between the input source and load is desired, each of the additional isolation transformers $T_1$ and $T_2$ may be integrated with its corresponding input and output inductances, thus resulting in the power amplifier shown in FIG. 12 which is comprised of only two magnetic circuits $M_1$ and $M_2$. Again as before, zero current ripple at both input and output may be achieved simultaneously by design of the coupled inductances for the matching conditions $n_i=k_i$, where i is 1, 2, 3 or 4 for the four different sets of coupled inductances.

Figure 13A:
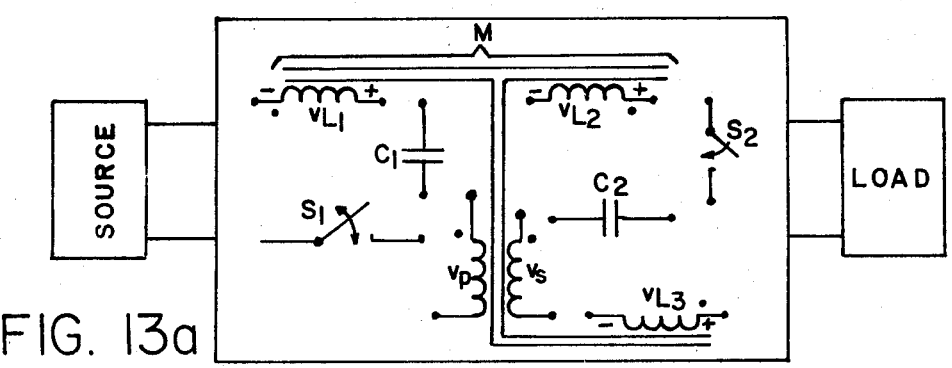
FIG. 13a is a schematic of an arbitrary switching configuration to which the method and the technique described in this invention can be implemented if the prerequisite of synchronized and proportional ideal voltage waveforms on inductors and transformers are as shown in FIG. 13b.
Figure 13B:
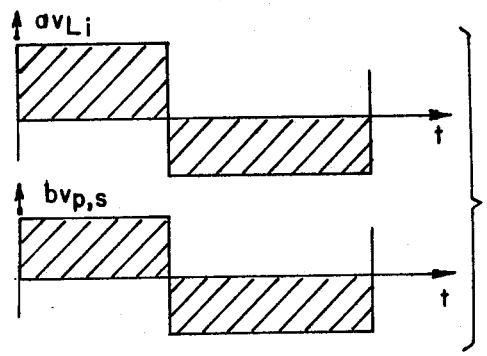

All these examples now illustrate wherein a complex switching configuration consisting of a number of storage elements (inductors, transformers and capacitors) and switches interconnected in such a way as to perform some useful function, such as dc-to-dc conversion, dc-to-ac inversion, or power amplification, the otherwise separate magnetic components (inductors and transformers) can be merged into an integral magnetic circuit with multiple windings. The prerequisite for such simplification of the arbitrary switching configuration shown in FIG. 13a and further performance improvement (reduced ripple currents) is the existance of synchronized and proportional voltage waveforms on the inductors and transformers as shown in FIG. 13b.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a dc-to-dc switching converter comprised of an input inductance connected in series with a source, an output inductance connected in series with a load, storage capacitance connected in series between said input inductance and output inductance, and switching means for alternatively connecting a junction between said input inductance and said storage capacitance, and a junction between said storage capacitance and said output inductance, to respective return current paths for said source and load, said storage capacitance being divided into a first capacitor in series with said input inductance and a second capacitor in series with said output inductance, an improvement comprising electromagnetic induction means for connecting said first capacitor to the return current path for said source and connecting said second capacitor to the return current path for said load, and said electromagnetic induction means having at least one winding and a magnetic circuit with at least two flux paths, one flux path for coupling said input inductance and a winding of said induction means, and another flux path for coupling said output inductance and a winding of said induction means.

2. An improvement as defined in claim 1 wherein said magnetic induction means are comprised of two windings electrically connected in parallel and magnetically isolated, by being on two separate cores with one winding being on one core with said input inductor and the other winding being on the other core with said output inductor.

3. An improvement as defined in claim 1 wherein said magnetic circuit is comprised of a single core having two flux paths with a common branch and only one winding on said common branch with said input inductance on one separate branch of one flux path, and said output inductance on another separate branch of the other flux path.

4. An improvement as defined in claim 1 wherein said magnetic circuit is comprised of an isolation transformer having a primary winding connected in series between said first capacitor and the return current path of said source, said primary winding being inductively coupled to said input inductance, and a secondary winding connected in series between said second capacitor and return current path of said load, said secondary winding being inductively coupled to said output inductance.

5. An improvement as defined in claim 4 wherein said dc-to-dc converter has an additional output inductance for supplying current to an additional load and an additional storage capacitor in series with said additional output inductance, and said switching means alternately connects a junction between said additional storage capacitor and additional output inductance to a return current path of said additional load, and said isolation transformer has an additional secondary winding connected in series between said additional capacitor and the return current path of said additional load, thereby to provide a separate output current to said additional load from said source, said additional output inductance being inductively coupled to said additional secondary winding and magnetically isolated from said input inductance and the other input inductance.

6. An improvement as defined in claim 1 wherein said magnetic circuit is comprised of an isolation transformer having a primary winding connected in series between said first capacitor and the return current path of said source and a secondary winding connected in series between said second capacitor and the return current path of said load, and a first inductance connected in parallel with said primary winding, said first inductance being inductively coupled to said input inductance and magnetically isolated from said output inductance, and a second inductance connected in parallel with said secondary winding, said second inductance being inductively coupled to said output inductance and magnetically isolated from said input inductance.

7. An improvement as defined in claim 1, 2, 3, 4, 5, or 6 wherein the coupling coefficients and turns ratios of said input inductance and a winding and of said output inductance and a winding are selected for a matching condition $n_i = k_i$, and $n_i$ is equal to the square root of the ratio of self inductances of said winding L to the inductance $L_i$, where i is 1 to indicate input inductance $L_1$ for the matching condition of zero ripple in the input current from said source, and i is 2 to indicate output inductance $L_2$ for the matching condition of zero ripple in the output current to said load, and in claim 5, i is 3 to indicate output inductance $L_3$ for the matching condition of zero ripple in the output current to said additional load.

8. A dc-to-dc switching converter comprised of an input inductance connected in series to a source, an output inductance connected in series with a load, a first storage capacitance connected in series with said input inductance and said source, a second storage capacitance connected in series with said output inductance and said load, an isolation transformer between said first and second storage capacitances having its primary winding connected in series between said first storage capacitance and the return current path for said source and its secondary winding connected in series between said second storage capacitance and the return current path for said load, switching means for alternately connecting a junction between said input inductance and said first storage capacitance and a junction between said second storage capacitance and said output inductance, to respective return current paths for said source and load, means for inductively coupling said primary winding to said input inductance while maintaining said primary winding magnetically isolated from said output inductance, and means for inductively coupling said secondary winding to said output inductance while maintaining said secondary winding magnetically isolated from said input inductance.

9. A dc-to-dc switching converter as defined in claim 8 wherein said isolation transformer has an additional secondary winding connected in series sequence with an additional storage capacitance and output inductance to and additional load, and said switching means alternately connects a junction between said additional storage capacitance and additional output inductance to a return current path of said additional load, thereby to provide a separate output current to said additional load from said source, said additional output inductance being inductively coupled to said additional secondary winding and magnetically isolated from said input inductance and the other output inductance.

10. A dc-to-dc switching converter as defined in claim 8 wherein said primary and secondary windings are not respectively coupled to said input and output inductances, and instead a first additional winding connected in parallel with said primary winding is so coupled with said input inductance and a second additional winding connected in parallel with said secondary winding is so coupled with said output inductance.

11. A dc-to-dc switching converter as defined in claim 10 wherein said isolation transformer is omitted and said first and second additional windings are instead connected together in parallel.

12. A dc-to-dc switching converter as defined in claim 11 wherein said first and second additional windings are replaced by a single winding magnetically coupled to the input inductance and to the output inductance by said inductive coupling means while maintaining said input inductance magnetically isolated from said output inductance.

13. An improvement as defined in claim 8, 9, 10, 11 or 12 wherein the coupling coefficients and turns ratios between said input inductance and a winding and between said output inductance and a winding are selected for a matching condition $n_i = k_i$, and $n_i$ is equal to the square root of the ratio of self inductance of said winding L to the inductance $L_i$, where i is 1 to indicate input inductance $L_1$ for the matching condition of zero ripple in the input current from said source, and i is 2 to indicate output inductance $L_2$ for the matching condition of zero ripple in the output current to said load, and in claim 9, i is 3 to indicate output inductance $L_3$ for the matching condition of zero ripple in the output current to said additional load.

14. A complex switching circuit in which a number of storage elements comprised of inductors, or inductors and transformers, and capacitors are interconnected with switches to perform a useful function, and in which windings of the separate inductors, or inductors and capacitors, are merged into an integral magnetic circuit with multiple flux paths sharing one common branch, and said windings are on separate branches of selected flux paths with one or more windings on said common branch, and in which windings have synchronized and proportional voltage waveforms, thereby to provide improved performance.

15. A complex switching circuit as defined in claim 14 wherein said storage elements are interconnected to perform as a converter, inverter or power amplifier, and the improved performance is reduced switching ripple at the input or output, or both the input or output of said circuit.

16. A complex switching circuit as defined in claim 15 wherein windings coupled are designed for a matching condition $n_i = k_i$, and $n_i$ is equal to the square root of the ratio of self inductances L of said winding on said common path to the inductance $L_i$ of the winding coupled to the winding on said common path, where i is set equal to an integer to indicate a particular one of said inductors for a reduction of ripple to a port of said circuit associated with the ith inductor.

17. A dc-to-dc switching converter having a source in series with an input inductance, an input energy storage capacitance, a primary winding of an isolation transformer, a return current path for said source, input switching means for periodically connecting a junction between said input inductance and said input energy storage capacitance to said return current path of said source, and means for inductively coupling said input inductance to said primary winding of said isolation transformer, and having an output energy storage capacitance connected in a current loop comprising a secondary of said isolation transformer and an output switching means, and a load connected in parallel with said output energy storage capacitance, said output switching means functioning to close the loop of said output energy storage capacitance and said secondary winding while said input switching means is not connecting the junction between said input inductance and said input energy storage capacitance to said return current path of said source.

18. A dc-to-dc switching converter having a load in series with an output inductance, an output energy storage capacitance, a secondary winding of an isolation transformer, a return current path for said load, and means for inductively coupling said output inductance to said secondary windin of said isolation transformer, and having a source connected in a current loop comprising a primary winding of said isolation transformer and input switching means for periodically closing said loop, and output switching means for connecting a junction between said output energy storage capacitance and said output inductance to said return current path for said load while said input switching means is in a condition to open said source current loop.

19. A switching power amplifier stage for producing an output voltage to a load comprised of two dc-to-dc converters with outputs connected to opposite ends of said load for parallel operation in a true push-pull mode from a single DC power source, each converter comprising an input inductance, a first energy storage capacitance, the primary winding of an isolation transformer, a return current path for said load, and bidirectional current means for periodically connecting a junction between said input inductance and said first energy storage capacitance to said return current path for said load, an output inductance, a secondary winding of an isolation transformer and a return current for said load, and bidirectional current switching means for alternately connecting a junction between said input inductance and first storage capacitance to said return current path for said source and a junction between said second storage capacitance and said output inductance to said return current path of said load, said switching means of one converter being 180° out of phase with said switching means of the other converter, and in each converter separately, means for inductively coupling said input inductance to the primary winding, and said output inductance to the secondary winding of said isolation transformer.

20. A switching power amplifier stage as defined in claim 19 wherein for each converter the coupling coefficeints and turn ratios of said input inductance and primary winding and of said output inductance and secondary winding are selected for a matching condition $n_i = k_i$, and $n_i$ is equal to the square root of the ratio of self inductance $L_a$, of said primary winding in one case and self inductance $L_b$ of said secondary winding in the other case to the inductance $L_i$, where i is 1 to indicate input inductance $L_1$ for the matching condition of zero ripple in the input current from said source in one case, and i is 2 to indicate output inductance $L_2$ for the matching condition of zero ripple in the output current to said load in the other case.

* * * * *

UNITED STATES PATENT AND TRADEMARK OFFICE
CERTIFICATE OF CORRECTION

PATENT NO. : 4,257,087
DATED : March 17, 1981
INVENTOR(S) : Slobodan M. Ćuk

It is certified that error appears in the above-identified patent and that said Letters Patent are hereby corrected as shown below:

Col. 10, line 63, "and" of first occurrence should be -- an --

Col. 11, line 28, "inductance" should be -- inductances --

Col. 12, line 20, "windin" should be -- winding --

Col. 12, line 56 "coefficeints" should be -- coefficients --

Signed and Sealed this

Twenty-eighth Day of July 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,257,087
DATED : March 17, 1981
INVENTOR(S) : Slobodan M. Cuk

It is certified that error appears in the above—identified patent and that said Letters Patent is hereby corrected as shown below:

Column 7, line 23, before "low" delete -- a --.

Column 9, line 1, "existance" should be -- existence --.

Signed and Sealed this

Fifteenth Day of September 1981

[SEAL]

Attest:

GERALD J. MOSSINGHOFF

Attesting Officer　　Commissioner of Patents and Trademarks